US009694751B2

(12) United States Patent
Lundy, Jr. et al.

(10) Patent No.: US 9,694,751 B2
(45) Date of Patent: Jul. 4, 2017

(54) REARVIEW ASSEMBLY

(71) Applicant: Gentex Corporation, Zeeland, MI (US)

(72) Inventors: Eric S. Lundy, Jr., Grand Rapids, MI (US); William L. Tonar, Holland, MI (US); Michael J. VanAst, Zeeland, MI (US); Christopher J. Van Huis, West Olive, MI (US); Brian J. Barksdale, Grand Rapids, MI (US); Danny L. Minikey, Jr., Fenwick, MI (US); Joel A. Stray, Hudsonville, MI (US); Mark R. Roth, Grand Rapids, MI (US)

(73) Assignee: GENTEX CORPORATION, Zeeland, MI (US)

( * ) Notice: Subject to any disclaimer, the term of this patent is extended or adjusted under 35 U.S.C. 154(b) by 8 days.

(21) Appl. No.: 14/858,256

(22) Filed: Sep. 18, 2015

(65) Prior Publication Data
US 2016/0082889 A1   Mar. 24, 2016

Related U.S. Application Data

(60) Provisional application No. 62/052,619, filed on Sep. 19, 2014.

(51) Int. Cl.
*G02F 1/15* (2006.01)
*B60R 1/08* (2006.01)
(Continued)

(52) U.S. Cl.
CPC ............. *B60R 1/088* (2013.01); *B60R 1/04* (2013.01); *G02F 1/153* (2013.01); *G02F 1/155* (2013.01)

(58) Field of Classification Search
CPC ......... G02F 1/155; G02F 1/153; B60R 1/088; B60R 1/04
(Continued)

(56) References Cited

U.S. PATENT DOCUMENTS 2,131,888 A   10/1938   Harris
2,632,040 A    3/1953   Rabinow
(Continued)

FOREIGN PATENT DOCUMENTS

DE   102010064082 A1   6/2012
EP         0513476      11/1992
(Continued)

OTHER PUBLICATIONS

Federal Institute of Industrial Property, "International Search Report and the Written Opinion of the International Searching Authority," Feb. 25, 2016 (9 pages), Moscow, Russia.
(Continued)

*Primary Examiner* — Tuyen Tra
(74) *Attorney, Agent, or Firm* — Price Heneveld LLP; Bradley D. Johnson

(57) ABSTRACT

A rearview assembly having an electro-optic element. A front substrate defines a first surface and a second surface. A front side edge is disposed between the first surface and the second surface. A rear substrate is operably coupled with the front substrate and spaced a predetermined distance therefrom. The rear substrate defines a third surface and a fourth surface. A rear side edge is disposed between the third surface and the fourth surface. A perimeter of the rear substrate is larger than a perimeter of the front substrate, such that an outer portion of the third surface is exposed, thereby defining a peripheral step between the front side edge and the rear side edge. An electro-optic material is disposed between the front substrate and the rear substrate. A bezel is configured to extend around the rear substrate, over the outer portion of the third surface.

18 Claims, 8 Drawing Sheets

(51) Int. Cl.
   *B60R 1/04*  (2006.01)
   *G02F 1/153*  (2006.01)
   *G02F 1/155*  (2006.01)

(58) Field of Classification Search
   USPC .................................................. 359/265–275
   See application file for complete search history.

(56) References Cited

U.S. PATENT DOCUMENTS

| | | |
|---|---|---|
| 2,827,594 A | 3/1958 | Rabinow |
| 3,179,845 A | 4/1965 | Kulwiec |
| 3,280,701 A | 10/1966 | Donnelly et al. |
| 3,581,276 A | 5/1971 | Newman |
| 3,663,819 A | 5/1972 | Hicks et al. |
| 3,837,129 A | 9/1974 | Losell |
| 4,109,235 A | 8/1978 | Bouthors |
| 4,139,801 A | 2/1979 | Linares |
| 4,151,526 A | 4/1979 | Hinachi et al. |
| 4,214,266 A | 7/1980 | Myers |
| 4,236,099 A | 11/1980 | Rosenblum |
| 4,257,703 A | 3/1981 | Goodrich |
| 4,258,979 A | 3/1981 | Mahin |
| 4,277,804 A | 7/1981 | Robison |
| 4,286,308 A | 8/1981 | Wolff |
| 4,310,851 A | 1/1982 | Pierrat |
| 4,357,558 A | 11/1982 | Massoni et al. |
| 4,376,909 A | 3/1983 | Tagami et al. |
| 4,479,173 A | 10/1984 | Rumpakis |
| 4,499,451 A | 2/1985 | Suzuki et al. |
| D283,998 S | 5/1986 | Tanaka |
| 4,599,544 A | 7/1986 | Martin |
| 4,630,904 A | 12/1986 | Pastore |
| 4,638,287 A | 1/1987 | Umebayashi et al. |
| 4,645,975 A | 2/1987 | Meitzler et al. |
| 4,665,321 A | 5/1987 | Chang et al. |
| 4,665,430 A | 5/1987 | Hiroyasu |
| 4,692,798 A | 9/1987 | Seko et al. |
| 4,716,298 A | 12/1987 | Etoh |
| 4,727,290 A | 2/1988 | Smith et al. |
| 4,740,838 A | 4/1988 | Mase et al. |
| 4,768,135 A | 8/1988 | Kretschmer et al. |
| 4,862,037 A | 8/1989 | Farber et al. |
| 4,891,559 A | 1/1990 | Matsumoto et al. |
| 4,902,108 A | 2/1990 | Byker |
| 4,910,591 A | 3/1990 | Petrossian et al. |
| 4,930,742 A | 6/1990 | Schofield et al. |
| 4,934,273 A | 6/1990 | Endriz |
| 4,967,319 A | 10/1990 | Seko |
| 5,005,213 A | 4/1991 | Hanson et al. |
| 5,008,946 A | 4/1991 | Ando |
| 5,027,200 A | 6/1991 | Petrossian et al. |
| 5,036,437 A | 7/1991 | Macks |
| 5,052,163 A | 10/1991 | Czekala |
| 5,066,112 A | 11/1991 | Lynam et al. |
| 5,069,535 A | 12/1991 | Baucke et al. |
| 5,072,154 A | 12/1991 | Chen |
| 5,073,012 A | 12/1991 | Lynam |
| 5,076,673 A | 12/1991 | Lynam et al. |
| 5,086,253 A | 2/1992 | Lawler |
| 5,096,287 A | 3/1992 | Kakinami et al. |
| 5,115,346 A | 5/1992 | Lynam |
| 5,121,200 A | 6/1992 | Choi et al. |
| 5,124,549 A | 6/1992 | Michaels et al. |
| 5,128,799 A | 7/1992 | Byker |
| 5,151,824 A | 9/1992 | O'Farrell |
| 5,158,638 A | 10/1992 | Osanami et al. |
| 5,166,681 A | 11/1992 | Bottesch et al. |
| 5,182,502 A | 1/1993 | Slotkowski et al. |
| 5,187,383 A | 2/1993 | Taccetta et al. |
| 5,197,562 A | 3/1993 | Kakinami et al. |
| 5,230,400 A | 7/1993 | Kakainami et al. |
| 5,235,178 A | 8/1993 | Hegyi |
| 5,243,417 A | 9/1993 | Pollard |
| 5,253,109 A | 10/1993 | O'Farrell et al. |
| 5,278,693 A | 1/1994 | Theiste |
| 5,280,380 A | 1/1994 | Byker |
| 5,282,077 A | 1/1994 | Byker |
| 5,289,321 A | 2/1994 | Secor |
| 5,294,376 A | 3/1994 | Byker |
| 5,296,924 A | 3/1994 | Blancard et al. |
| D346,356 S | 4/1994 | Leu |
| 5,304,980 A | 4/1994 | Maekawa |
| 5,329,206 A | 7/1994 | Slotkowski et al. |
| 5,336,448 A | 8/1994 | Byker |
| 5,347,261 A | 9/1994 | Adell |
| 5,347,459 A | 9/1994 | Greenspan et al. |
| 5,355,146 A | 10/1994 | Chiu et al. |
| 5,379,104 A | 1/1995 | Takao |
| 5,379,146 A | 1/1995 | Defendini |
| 5,381,309 A | 1/1995 | Borchardt |
| 5,386,285 A | 1/1995 | Asayama |
| 5,396,054 A | 3/1995 | Krichever et al. |
| 5,402,170 A | 3/1995 | Parulski et al. |
| 5,408,357 A | 4/1995 | Beukema |
| 5,414,461 A | 5/1995 | Kishi et al. |
| 5,416,318 A | 5/1995 | Hegyi |
| 5,418,610 A | 5/1995 | Fischer |
| 5,421,940 A | 6/1995 | Cornils et al. |
| 5,424,952 A | 6/1995 | Asayama |
| 5,426,294 A | 6/1995 | Kobayashi et al. |
| 5,428,464 A | 6/1995 | Silverbrook |
| 5,430,450 A | 7/1995 | Holmes |
| 5,434,407 A | 7/1995 | Bauer et al. |
| 5,448,397 A | 9/1995 | Tonar |
| 5,451,822 A | 9/1995 | Bechtel et al. |
| 5,452,004 A | 9/1995 | Roberts |
| 5,469,298 A | 11/1995 | Suman et al. |
| 5,471,515 A | 11/1995 | Fossum et al. |
| 5,475,441 A | 12/1995 | Parulski et al. |
| 5,475,494 A | 12/1995 | Nishida et al. |
| 5,481,268 A | 1/1996 | Higgins |
| 5,483,346 A | 1/1996 | Butzer |
| 5,483,453 A | 1/1996 | Uemura et al. |
| 5,485,155 A | 1/1996 | Hibino |
| 5,485,378 A | 1/1996 | Franke et al. |
| 5,488,496 A | 1/1996 | Pine |
| 5,508,592 A | 4/1996 | Lapatovich et al. |
| 5,515,448 A | 5/1996 | Nishitani |
| 5,523,811 A | 6/1996 | Wada et al. |
| 5,530,421 A | 6/1996 | Marshall et al. |
| 5,535,144 A | 7/1996 | Kise |
| 5,537,003 A | 7/1996 | Bechtel et al. |
| 5,541,590 A | 7/1996 | Nishio |
| 5,541,724 A | 7/1996 | Hoashi |
| 5,550,677 A | 8/1996 | Schofield et al. |
| 5,554,912 A | 9/1996 | Thayer et al. |
| 5,574,443 A | 11/1996 | Hsieh |
| 5,574,463 A | 11/1996 | Shirai et al. |
| 5,576,975 A | 11/1996 | Sasaki et al. |
| 5,587,929 A | 12/1996 | League et al. |
| 5,592,146 A | 1/1997 | Kover, Jr. et al. |
| 5,602,542 A | 2/1997 | Widmann et al. |
| 5,614,788 A | 3/1997 | Mullins et al. |
| 5,615,023 A | 3/1997 | Yang |
| 5,617,085 A | 4/1997 | Tsutsumi et al. |
| 5,621,460 A | 4/1997 | Hatlestad et al. |
| 5,634,709 A | 6/1997 | Iwama |
| 5,642,238 A | 6/1997 | Sala |
| 5,646,614 A | 7/1997 | Abersfelder et al. |
| 5,649,756 A | 7/1997 | Adams et al. |
| 5,650,765 A | 7/1997 | Park |
| 5,660,454 A | 8/1997 | Mori et al. |
| 5,666,028 A | 9/1997 | Bechtel et al. |
| 5,670,935 A | 9/1997 | Schofield et al. |
| 5,679,283 A | 10/1997 | Tonar |
| 5,680,123 A | 10/1997 | Lee |
| 5,682,267 A | 10/1997 | Tonar |
| 5,684,473 A | 11/1997 | Hibino et al. |
| 5,689,370 A | 11/1997 | Tonar |
| 5,707,129 A | 1/1998 | Kobayashi |
| 5,708,410 A | 1/1998 | Blank et al. |
| 5,708,857 A | 1/1998 | Ishibashi |
| 5,710,565 A | 1/1998 | Shirai et al. |
| 5,714,751 A | 2/1998 | Chen |

(56) References Cited

U.S. PATENT DOCUMENTS

| | | |
|---|---|---|
| 5,715,093 A | 2/1998 | Schierbeek et al. |
| 5,729,194 A | 3/1998 | Spears et al. |
| 5,736,816 A | 4/1998 | Strenke et al. |
| 5,742,026 A | 4/1998 | Dickinson |
| 5,745,050 A | 4/1998 | Nakagawa |
| 5,751,211 A | 5/1998 | Shirai et al. |
| 5,751,832 A | 5/1998 | Panter et al. |
| 5,754,099 A | 5/1998 | Nishimura et al. |
| 5,760,828 A | 6/1998 | Cortes |
| 5,764,139 A | 6/1998 | Nojima et al. |
| 5,767,793 A | 6/1998 | Agravante et al. |
| 5,781,105 A | 7/1998 | Bitar et al. |
| 5,786,787 A | 7/1998 | Eriksson et al. |
| 5,790,298 A | 8/1998 | Tonar |
| 5,793,308 A | 8/1998 | Rosinski et al. |
| 5,793,420 A | 8/1998 | Schmidt |
| 5,796,094 A | 8/1998 | Schofield et al. |
| 5,798,727 A | 8/1998 | Shirai et al. |
| 5,803,579 A | 9/1998 | Turnbull |
| 5,808,778 A | 9/1998 | Bauer et al. |
| 5,811,888 A | 9/1998 | Hsieh |
| 5,812,321 A | 9/1998 | Schierbeek et al. |
| 5,818,625 A | 10/1998 | Forgette et al. |
| 5,825,527 A | 10/1998 | Forgette et al. |
| D400,481 S | 11/1998 | Stephens et al. |
| D401,200 S | 11/1998 | Huang |
| 5,837,994 A | 11/1998 | Stam |
| 5,841,126 A | 11/1998 | Fossum et al. |
| 5,844,505 A | 12/1998 | Van Ryzin |
| 5,845,000 A | 12/1998 | Breed et al. |
| 5,850,176 A | 12/1998 | Kinoshita et al. |
| 5,867,214 A | 2/1999 | Anderson et al. |
| 5,877,897 A | 3/1999 | Schofield et al. |
| 5,883,739 A | 3/1999 | Ashihara et al. |
| 5,888,431 A | 3/1999 | Tonar et al. |
| 5,896,119 A | 4/1999 | Evanicky et al. |
| 5,904,729 A | 5/1999 | Ruzicka |
| 5,905,457 A | 5/1999 | Rashid |
| D410,607 S | 6/1999 | Carter |
| 5,912,534 A | 6/1999 | Benedict |
| 5,923,027 A | 7/1999 | Stam |
| 5,923,457 A | 7/1999 | Byker et al. |
| 5,928,572 A | 7/1999 | Tonar et al. |
| 5,935,613 A | 8/1999 | Benham et al. |
| 5,940,011 A | 8/1999 | Agravante et al. |
| 5,940,201 A | 8/1999 | Ash et al. |
| 5,942,853 A | 8/1999 | Piscart |
| 5,949,331 A | 9/1999 | Schofield et al. |
| 5,956,012 A | 9/1999 | Turnbull et al. |
| 5,956,079 A | 9/1999 | Ridgley |
| 5,956,181 A | 9/1999 | Lin |
| 5,959,555 A | 9/1999 | Furuta |
| 5,990,469 A | 11/1999 | Bechtel |
| 5,998,617 A | 12/1999 | Srinivasa |
| 6,002,511 A | 12/1999 | Varaprasad |
| 6,008,486 A | 12/1999 | Stam |
| 6,009,359 A | 12/1999 | El-Hakim et al. |
| 6,018,308 A | 1/2000 | Shirai |
| 6,020,987 A | 2/2000 | Baumann |
| 6,023,040 A | 2/2000 | Zahavi |
| 6,023,229 A | 2/2000 | Bugno et al. |
| 6,025,872 A | 2/2000 | Ozaki et al. |
| 6,037,471 A | 3/2000 | Srinivasa |
| 6,043,452 A | 3/2000 | Bestenlehrer |
| 6,046,766 A | 4/2000 | Sakata |
| 6,049,171 A | 4/2000 | Stam |
| 6,051,956 A | 4/2000 | Nakashimo |
| 6,060,989 A | 5/2000 | Gehlot |
| 6,061,002 A | 5/2000 | Weber et al. |
| 6,062,920 A | 5/2000 | Jordan |
| 6,064,508 A | 5/2000 | Forgette et al. |
| 6,064,509 A | 5/2000 | Tonar et al. |
| 6,067,111 A | 5/2000 | Hahn et al. |
| 6,068,380 A | 5/2000 | Lynn et al. |
| 6,072,391 A | 6/2000 | Suzuki et al. |
| 6,078,355 A | 6/2000 | Zengel |
| 6,084,700 A | 7/2000 | Knapp |
| 6,097,023 A | 8/2000 | Schofield et al. |
| 6,102,546 A | 8/2000 | Carter |
| 6,106,121 A | 8/2000 | Buckley et al. |
| 6,111,498 A | 8/2000 | Jobes et al. |
| 6,111,683 A | 8/2000 | Cammenga |
| 6,111,684 A | 8/2000 | Forgette |
| 6,115,651 A | 9/2000 | Cruz |
| 6,122,597 A | 9/2000 | Saneyoshi et al. |
| 6,128,576 A | 10/2000 | Nishimoto et al. |
| 6,130,421 A | 10/2000 | Bechtel |
| 6,130,448 A | 10/2000 | Bauer et al. |
| 6,132,072 A | 10/2000 | Turnbull |
| 6,140,933 A | 10/2000 | Bugno |
| 6,144,158 A | 11/2000 | Beam |
| 6,151,065 A | 11/2000 | Steed et al. |
| 6,151,539 A | 11/2000 | Bergholz et al. |
| 6,154,149 A | 11/2000 | Tychkowski et al. |
| 6,157,294 A | 12/2000 | Urai et al. |
| 6,166,628 A | 12/2000 | Andreas |
| 6,166,698 A | 12/2000 | Turnbull et al. |
| 6,166,848 A | 12/2000 | Cammenga et al. |
| 6,167,755 B1 | 1/2001 | Damson et al. |
| 6,170,956 B1 | 1/2001 | Rumsey et al. |
| 6,172,600 B1 | 1/2001 | Kakinami et al. |
| 6,172,601 B1 | 1/2001 | Wada et al. |
| 6,175,300 B1 | 1/2001 | Kendrick |
| 6,184,781 B1 | 2/2001 | Ramakesavan |
| 6,185,492 B1 | 2/2001 | Kagawa et al. |
| 6,188,505 B1 | 2/2001 | Lomprey |
| 6,191,704 B1 | 2/2001 | Takenaga et al. |
| 6,193,378 B1 | 2/2001 | Tonar et al. |
| 6,193,912 B1 | 2/2001 | Thieste |
| 6,195,194 B1 | 2/2001 | Roberts et al. |
| 6,200,010 B1 | 3/2001 | Anders |
| 6,218,934 B1 | 4/2001 | Regan |
| 6,222,177 B1 | 4/2001 | Bechtel |
| 6,222,447 B1 | 4/2001 | Schofield et al. |
| 6,224,716 B1 | 5/2001 | Yoder |
| 6,229,435 B1 | 5/2001 | Knapp |
| 6,239,898 B1 | 5/2001 | Byker |
| 6,239,899 B1 | 5/2001 | DeVries et al. |
| 6,244,716 B1 | 6/2001 | Steenwyk |
| 6,246,507 B1 | 6/2001 | Bauer |
| 6,247,819 B1 | 6/2001 | Turnbull |
| 6,249,214 B1 | 6/2001 | Kashiwazaki |
| 6,249,369 B1 | 6/2001 | Theiste et al. |
| 6,250,766 B1 | 6/2001 | Strumolo et al. |
| 6,255,639 B1 | 7/2001 | Stam |
| 6,259,475 B1 | 7/2001 | Ramachandran et al. |
| 6,262,831 B1 | 7/2001 | Bauer |
| 6,262,832 B1 | 7/2001 | Lomprey |
| 6,265,968 B1 | 7/2001 | Betzitza et al. |
| 6,268,803 B1 | 7/2001 | Gunderson et al. |
| 6,268,950 B1 | 7/2001 | Ash |
| 6,269,308 B1 | 7/2001 | Kodaka et al. |
| 6,281,632 B1 | 8/2001 | Stam |
| 6,281,804 B1 | 8/2001 | Haller et al. |
| 6,289,332 B2 | 9/2001 | Menig et al. |
| 6,291,812 B1 | 9/2001 | Bechtel |
| 6,300,879 B1 | 10/2001 | Regan et al. |
| 6,304,173 B2 | 10/2001 | Pala et al. |
| 6,313,457 B1 | 11/2001 | Bauer |
| 6,313,892 B2 | 11/2001 | Gleckman |
| 6,317,057 B1 | 11/2001 | Lee |
| 6,317,248 B1 | 11/2001 | Agrawal et al. |
| 6,320,612 B1 | 11/2001 | Young |
| 6,324,295 B1 | 11/2001 | Valery et al. |
| D451,869 S | 12/2001 | Knapp et al. |
| 6,329,925 B1 | 12/2001 | Skiver et al. |
| 6,330,511 B2 | 12/2001 | Ogura et al. |
| 6,335,548 B1 | 1/2002 | Roberts |
| 6,335,680 B1 | 1/2002 | Matsuoka |
| 6,344,805 B1 | 2/2002 | Yasui et al. |
| 6,348,858 B2 | 2/2002 | Weis et al. |
| 6,349,782 B1 | 2/2002 | Sekiya et al. |
| 6,356,206 B1 | 3/2002 | Takenaga et al. |
| 6,356,376 B1 | 3/2002 | Tonar |

(56) References Cited

U.S. PATENT DOCUMENTS

| | | |
|---|---|---|
| 6,357,883 B1 | 3/2002 | Strumolo et al. |
| 6,359,274 B1 | 3/2002 | Nixon |
| 6,363,326 B1 | 3/2002 | Scully |
| 6,369,701 B1 | 4/2002 | Yoshida et al. |
| 6,379,013 B1 | 4/2002 | Bechtel |
| 6,392,783 B1 | 5/2002 | Lomprey |
| 6,396,040 B1 | 5/2002 | Hill |
| 6,396,397 B1 | 5/2002 | Bos et al. |
| 6,402,328 B1 | 6/2002 | Bechtel |
| 6,403,942 B1 | 6/2002 | Stam |
| 6,407,468 B1 | 6/2002 | LeVesque et al. |
| 6,407,847 B1 | 6/2002 | Poll et al. |
| 6,408,247 B1 | 6/2002 | Ichikawa et al. |
| 6,412,959 B1 | 7/2002 | Tseng |
| 6,415,230 B1 | 7/2002 | Maruko et al. |
| 6,420,800 B1 | 7/2002 | LeVesque |
| 6,421,081 B1 | 7/2002 | Markus |
| 6,424,272 B1 | 7/2002 | Gutta et al. |
| 6,424,273 B1 | 7/2002 | Gutta et al. |
| 6,424,892 B1 | 7/2002 | Matsuoka |
| 6,426,485 B1 | 7/2002 | Buljajewski |
| 6,428,172 B1 | 8/2002 | Hutzel et al. |
| 6,429,594 B1 | 8/2002 | Stam |
| 6,433,680 B1 | 8/2002 | Ho |
| 6,437,688 B1 | 8/2002 | Kobayashi |
| 6,438,491 B1 | 8/2002 | Farmer |
| 6,441,872 B1 | 8/2002 | Ho |
| 6,441,943 B1 | 8/2002 | Roberts |
| 6,442,465 B2 | 8/2002 | Breed et al. |
| 6,443,585 B1 | 9/2002 | Saccomanno |
| 6,443,602 B1 | 9/2002 | Tanabe et al. |
| 6,447,128 B1 | 9/2002 | Lang et al. |
| 6,452,533 B1 | 9/2002 | Yamabuchi et al. |
| 6,463,369 B2 | 10/2002 | Sadano et al. |
| 6,465,962 B1 | 10/2002 | Fu et al. |
| 6,465,963 B1 | 10/2002 | Turnbull |
| 6,466,701 B1 | 10/2002 | Ejiri et al. |
| 6,469,739 B1 | 10/2002 | Bechtel |
| 6,471,362 B1 | 10/2002 | Carter |
| 6,472,977 B1 | 10/2002 | Pochmuller |
| 6,473,001 B1 | 10/2002 | Blum |
| 6,476,731 B1 | 11/2002 | Miki et al. |
| 6,476,855 B1 | 11/2002 | Yamamoto |
| 6,483,429 B1 | 11/2002 | Yasui et al. |
| 6,483,438 B2 | 11/2002 | DeLine et al. |
| 6,487,500 B2 | 11/2002 | Lemelson et al. |
| 6,491,416 B1 | 12/2002 | Strazzanti |
| 6,498,620 B2 | 12/2002 | Schofield et al. |
| 6,501,387 B2 | 12/2002 | Skiver et al. |
| 6,504,142 B2 | 1/2003 | Nixon |
| 6,507,779 B2 | 1/2003 | Breed et al. |
| 6,512,624 B2 | 1/2003 | Tonar |
| 6,515,581 B1 | 2/2003 | Ho |
| 6,515,597 B1 | 2/2003 | Wada et al. |
| 6,520,667 B1 | 2/2003 | Mousseau |
| 6,521,916 B2 | 2/2003 | Roberts |
| 6,522,969 B2 | 2/2003 | Kannonji |
| 6,523,976 B1 | 2/2003 | Turnbull |
| D471,847 S | 3/2003 | Rumsey et al. |
| 6,535,126 B2 | 3/2003 | Lin et al. |
| 6,542,085 B1 | 4/2003 | Yang |
| 6,542,182 B1 | 4/2003 | Chutorash |
| 6,545,598 B1 | 4/2003 | de Villeroche |
| 6,545,794 B2 | 4/2003 | Ash |
| 6,550,943 B2 | 4/2003 | Strazzanti |
| 6,553,130 B1 | 4/2003 | Lemelson et al. |
| 6,558,026 B2 | 5/2003 | Strazzanti |
| 6,559,761 B1 | 5/2003 | Miller et al. |
| 6,572,233 B1 | 6/2003 | Northman et al. |
| 6,575,643 B2 | 6/2003 | Takahashi |
| 6,580,373 B1 | 6/2003 | Ohashi |
| 6,581,007 B2 | 6/2003 | Hasegawa et al. |
| 6,583,730 B2 | 6/2003 | Lang et al. |
| 6,587,573 B1 | 7/2003 | Stam |
| 6,591,192 B2 | 7/2003 | Okamura et al. |
| 6,594,583 B2 | 7/2003 | Ogura et al. |
| 6,594,614 B2 | 7/2003 | Studt et al. |
| 6,606,183 B2 | 8/2003 | Ikai et al. |
| 6,611,202 B2 | 8/2003 | Schofield et al. |
| 6,611,227 B1 | 8/2003 | Nebiyeloul-Kifle |
| 6,611,610 B1 | 8/2003 | Stam et al. |
| 6,611,759 B2 | 8/2003 | Brosche |
| 6,614,387 B1 | 9/2003 | Deadman |
| 6,614,579 B2 | 9/2003 | Roberts et al. |
| 6,616,764 B2 | 9/2003 | Kramer et al. |
| 6,617,564 B2 | 9/2003 | Ockerse et al. |
| 6,618,672 B2 | 9/2003 | Sasaki et al. |
| 6,630,888 B2 | 10/2003 | Lang et al. |
| 6,631,316 B2 | 10/2003 | Stam et al. |
| 6,635,194 B2 | 10/2003 | Kloeppner |
| 6,636,258 B2 | 10/2003 | Strumolo |
| 6,642,840 B2 | 11/2003 | Lang et al. |
| 6,642,851 B2 | 11/2003 | Deline et al. |
| 6,648,477 B2 | 11/2003 | Hutzel et al. |
| 6,650,457 B2 | 11/2003 | Busscher et al. |
| 6,657,767 B2 | 12/2003 | Bonardi |
| 6,665,592 B2 | 12/2003 | Kodama |
| 6,670,207 B1 | 12/2003 | Roberts |
| 6,670,910 B2 | 12/2003 | Delcheccolo et al. |
| 6,674,370 B2 | 1/2004 | Rodewald et al. |
| 6,675,075 B1 | 1/2004 | Engelsberg et al. |
| 6,677,986 B1 | 1/2004 | Pöchmüller |
| 6,683,539 B2 | 1/2004 | Trajkovic et al. |
| 6,683,969 B1 | 1/2004 | Nishigaki et al. |
| 6,690,268 B2 | 2/2004 | Schofield et al. |
| 6,690,413 B1 | 2/2004 | Moore |
| 6,693,517 B2 | 2/2004 | McCarthy et al. |
| 6,693,518 B2 | 2/2004 | Kumata |
| 6,693,519 B2 | 2/2004 | Keirstead |
| 6,693,524 B1 | 2/2004 | Payne |
| 6,700,692 B2 | 3/2004 | Tonar |
| 6,717,610 B1 | 4/2004 | Bos et al. |
| 6,727,808 B1 | 4/2004 | Uselmann et al. |
| 6,727,844 B1 | 4/2004 | Zimmermann et al. |
| 6,731,332 B1 | 5/2004 | Yasui et al. |
| 6,734,807 B2 | 5/2004 | King |
| 6,737,964 B2 | 5/2004 | Samman et al. |
| 6,738,088 B1 | 5/2004 | Uskolovsky et al. |
| 6,744,353 B2 | 6/2004 | Sjonell |
| 6,746,122 B2 | 6/2004 | Knox |
| D493,131 S | 7/2004 | Lawlor et al. |
| D493,394 S | 7/2004 | Lawlor et al. |
| 6,768,566 B2 | 7/2004 | Walker |
| 6,772,057 B2 | 8/2004 | Breed et al. |
| 6,774,988 B2 | 8/2004 | Stam |
| 6,781,738 B2 | 8/2004 | Kikuchi et al. |
| 6,816,145 B1 | 11/2004 | Evanicky |
| 6,816,297 B1 | 11/2004 | Tonar |
| D499,678 S | 12/2004 | Bradley |
| 6,846,098 B2 | 1/2005 | Bourdelais et al. |
| 6,847,487 B2 | 1/2005 | Burgner |
| 6,853,413 B2 | 2/2005 | Larson |
| 6,861,809 B2 | 3/2005 | Stam |
| 6,870,656 B2 | 3/2005 | Tonar et al. |
| 6,902,284 B2 | 6/2005 | Hutzel et al. |
| 6,902,307 B2 | 6/2005 | Strazzanti |
| 6,912,001 B2 | 6/2005 | Okamoto et al. |
| 6,913,375 B2 | 7/2005 | Strazzanti |
| 6,923,080 B1 | 8/2005 | Dobler et al. |
| 6,930,737 B2 | 8/2005 | Weindorf et al. |
| 6,934,080 B2 | 8/2005 | Saccomanno et al. |
| 6,946,978 B2 | 9/2005 | Schofield |
| 6,968,273 B2 | 11/2005 | Ockerse |
| 7,012,543 B2 | 3/2006 | DeLine et al. |
| 7,038,577 B2 | 5/2006 | Pawlicki et al. |
| 7,042,616 B2 | 5/2006 | Tonar et al. |
| 7,046,448 B2 | 5/2006 | Burgner |
| 7,064,882 B2 | 6/2006 | Tonar |
| 7,175,291 B1 | 2/2007 | Shin-Nan Li |
| 7,255,465 B2 | 8/2007 | DeLine et al. |
| 7,262,406 B2 | 8/2007 | Heslin et al. |
| 7,265,342 B2 | 9/2007 | Heslin et al. |
| D553,061 S | 10/2007 | Schmidt et al. |
| 7,285,903 B2 | 10/2007 | Cull et al. |

(56) References Cited

U.S. PATENT DOCUMENTS

| | | |
|---|---|---|
| 7,287,868 B2 | 10/2007 | Carter |
| 7,292,208 B1 | 11/2007 | Park et al. |
| 7,311,428 B2 | 12/2007 | DeLine et al. |
| 7,321,112 B2 | 1/2008 | Stam et al. |
| 7,324,261 B2 | 1/2008 | Tonar et al. |
| 7,342,707 B2 | 3/2008 | Roberts |
| 7,360,932 B2 | 4/2008 | Uken et al. |
| 7,417,221 B2 | 8/2008 | Creswick et al. |
| 7,417,717 B2 | 8/2008 | Pack |
| 7,446,650 B2 | 11/2008 | Scholfield et al. |
| 7,467,883 B2 | 12/2008 | DeLine et al. |
| 7,468,651 B2 | 12/2008 | DeLine et al. |
| 7,505,047 B2 | 3/2009 | Yoshimura |
| 7,533,998 B2 | 5/2009 | Schofield et al. |
| 7,548,291 B2 | 6/2009 | Lee et al. |
| 7,565,006 B2 | 7/2009 | Stam et al. |
| 7,567,291 B2 | 7/2009 | Bechtel et al. |
| 7,579,940 B2 | 8/2009 | Schofield et al. |
| 7,592,563 B2 | 9/2009 | Wissenbach |
| 7,619,508 B2 | 11/2009 | Lynam et al. |
| 7,653,215 B2 | 1/2010 | Stam |
| 7,658,521 B2 | 2/2010 | DeLine et al. |
| 7,663,798 B2 | 2/2010 | Tonar |
| 7,683,326 B2 | 3/2010 | Stam et al. |
| 7,688,495 B2 | 3/2010 | Tonar et al. |
| 7,706,046 B2 | 4/2010 | Bauer et al. |
| 7,711,479 B2 | 5/2010 | Taylor et al. |
| 7,719,408 B2 | 5/2010 | DeWard et al. |
| 7,720,580 B2 | 5/2010 | Higgins-Luthman |
| 7,746,534 B2 | 6/2010 | Tonar et al. |
| 7,815,326 B2 | 10/2010 | Blank et al. |
| 7,817,020 B2 | 10/2010 | Turnbull et al. |
| 7,821,696 B2 | 10/2010 | Tonar et al. |
| 7,826,123 B2 * | 11/2010 | McCabe ............... B60R 1/088 359/265 |
| 7,830,583 B2 | 11/2010 | Neuman et al. |
| 7,864,399 B2 | 1/2011 | McCabe et al. |
| 7,877,175 B2 | 1/2011 | Higgins-Luthman |
| 7,881,496 B2 | 2/2011 | Camilleri et al. |
| 7,881,839 B2 | 2/2011 | Stam et al. |
| 7,888,629 B2 | 2/2011 | Heslin et al. |
| 7,914,188 B2 | 3/2011 | DeLine et al. |
| 7,972,045 B2 | 7/2011 | Schofield |
| 7,978,393 B2 | 7/2011 | Tonar et al. |
| 7,994,471 B2 | 8/2011 | Heslin et al. |
| 8,031,225 B2 | 10/2011 | Watanabe et al. |
| 8,035,881 B2 | 10/2011 | Luten et al. |
| 8,045,760 B2 | 10/2011 | Stam et al. |
| 8,059,235 B2 | 11/2011 | Utsumi et al. |
| 8,063,753 B2 | 11/2011 | Deline et al. |
| 8,090,153 B2 | 1/2012 | Schofield et al. |
| 8,095,310 B2 | 1/2012 | Taylor et al. |
| 8,100,568 B2 | 1/2012 | Deline et al. |
| 8,116,929 B2 | 2/2012 | Higgins-Luthman |
| 8,120,652 B2 | 2/2012 | Bechtel et al. |
| 8,142,059 B2 | 3/2012 | Higgins-Luthman et al. |
| 8,157,238 B2 * | 4/2012 | Lee ............... B60R 1/04 248/181.1 |
| 8,162,518 B2 | 4/2012 | Schofield |
| 8,194,133 B2 | 6/2012 | DeWind et al. |
| 8,201,800 B2 * | 6/2012 | Filipiak ............... B60R 1/04 248/483 |
| 8,203,433 B2 | 6/2012 | Deuber et al. |
| 8,217,830 B2 | 7/2012 | Lynam |
| 8,222,588 B2 | 7/2012 | Schofield et al. |
| 8,237,909 B2 | 8/2012 | Ostreko et al. |
| 8,258,433 B2 | 9/2012 | Byers et al. |
| 8,282,226 B2 | 10/2012 | Blank et al. |
| 8,325,028 B2 | 12/2012 | Schofield et al. |
| 8,482,683 B2 | 7/2013 | Hwang et al. |
| 8,520,069 B2 | 8/2013 | Haler |
| 8,564,662 B2 | 10/2013 | Busch et al. |
| 8,779,910 B2 | 7/2014 | DeLine et al. |
| 2001/0019356 A1 | 9/2001 | Takeda et al. |
| 2001/0022616 A1 | 9/2001 | Rademacher et al. |
| 2001/0026316 A1 | 10/2001 | Senatore |
| 2001/0045981 A1 | 11/2001 | Gloger et al. |
| 2002/0040962 A1 | 4/2002 | Schofield et al. |
| 2002/0044065 A1 | 4/2002 | Quist et al. |
| 2002/0191127 A1 | 12/2002 | Roberts et al. |
| 2003/0002165 A1 | 1/2003 | Mathias et al. |
| 2003/0007261 A1 | 1/2003 | Hutzel et al. |
| 2003/0016125 A1 | 1/2003 | Lang et al. |
| 2003/0016287 A1 | 1/2003 | Nakayama et al. |
| 2003/0025596 A1 | 2/2003 | Lang et al. |
| 2003/0025597 A1 | 2/2003 | Schofield |
| 2003/0030546 A1 | 2/2003 | Tseng |
| 2003/0030551 A1 | 2/2003 | Ho |
| 2003/0030724 A1 | 2/2003 | Okamoto |
| 2003/0035050 A1 | 2/2003 | Mizusawa |
| 2003/0043269 A1 | 3/2003 | Park |
| 2003/0052969 A1 | 3/2003 | Satoh et al. |
| 2003/0058338 A1 | 3/2003 | Kawauchi et al. |
| 2003/0067383 A1 | 4/2003 | Yang |
| 2003/0076415 A1 | 4/2003 | Strumolo |
| 2003/0080877 A1 | 5/2003 | Takagi et al. |
| 2003/0085806 A1 | 5/2003 | Samman et al. |
| 2003/0088361 A1 | 5/2003 | Sekiguchi |
| 2003/0090568 A1 | 5/2003 | Pico |
| 2003/0090569 A1 | 5/2003 | Poechmueller |
| 2003/0090570 A1 | 5/2003 | Takagi et al. |
| 2003/0098908 A1 | 5/2003 | Misaiji et al. |
| 2003/0103141 A1 | 6/2003 | Bechtel et al. |
| 2003/0103142 A1 | 6/2003 | Hitomi et al. |
| 2003/0117522 A1 | 6/2003 | Okada |
| 2003/0122929 A1 | 7/2003 | Minaudo et al. |
| 2003/0122930 A1 | 7/2003 | Schofield et al. |
| 2003/0133014 A1 | 7/2003 | Mendoza |
| 2003/0137586 A1 | 7/2003 | Lewellen |
| 2003/0141965 A1 | 7/2003 | Gunderson et al. |
| 2003/0146831 A1 | 8/2003 | Berberich et al. |
| 2003/0169158 A1 | 9/2003 | Paul, Jr. |
| 2003/0179293 A1 | 9/2003 | Oizumi |
| 2003/0202096 A1 | 10/2003 | Kim |
| 2003/0202357 A1 | 10/2003 | Strazzanti |
| 2003/0214576 A1 | 11/2003 | Koga |
| 2003/0214584 A1 | 11/2003 | Ross, Jr. |
| 2003/0214733 A1 | 11/2003 | Fujikawa et al. |
| 2003/0222793 A1 | 12/2003 | Tanaka et al. |
| 2003/0222983 A1 | 12/2003 | Nobori et al. |
| 2003/0227546 A1 | 12/2003 | Hilborn et al. |
| 2004/0004541 A1 | 1/2004 | Hong |
| 2004/0027695 A1 | 2/2004 | Lin |
| 2004/0032321 A1 | 2/2004 | McMahon et al. |
| 2004/0036768 A1 | 2/2004 | Green |
| 2004/0051634 A1 | 3/2004 | Schofield et al. |
| 2004/0056955 A1 | 3/2004 | Berberich et al. |
| 2004/0057131 A1 | 3/2004 | Hutzel et al. |
| 2004/0064241 A1 | 4/2004 | Sekiguchi |
| 2004/0066285 A1 | 4/2004 | Sekiguchi |
| 2004/0075603 A1 | 4/2004 | Kodama |
| 2004/0080404 A1 | 4/2004 | White |
| 2004/0080431 A1 | 4/2004 | White |
| 2004/0085196 A1 | 5/2004 | Milelr et al. |
| 2004/0090314 A1 | 5/2004 | Iwamoto |
| 2004/0090317 A1 | 5/2004 | Rothkop |
| 2004/0096082 A1 | 5/2004 | Nakai et al. |
| 2004/0098196 A1 | 5/2004 | Sekiguchi |
| 2004/0107030 A1 | 6/2004 | Nishira et al. |
| 2004/0107617 A1 | 6/2004 | Shoen et al. |
| 2004/0109060 A1 | 6/2004 | Ishii |
| 2004/0114039 A1 | 6/2004 | Ishikura |
| 2004/0119668 A1 | 6/2004 | Homma et al. |
| 2004/0125905 A1 | 7/2004 | Vlasenko et al. |
| 2004/0202001 A1 | 10/2004 | Roberts et al. |
| 2005/0140855 A1 | 6/2005 | Utsumi |
| 2005/0237440 A1 | 10/2005 | Sugimura et al. |
| 2006/0007550 A1 | 1/2006 | Tonar et al. |
| 2006/0115759 A1 | 6/2006 | Kim et al. |
| 2006/0139953 A1 | 6/2006 | Chou et al. |
| 2006/0158899 A1 | 7/2006 | Ayabe et al. |
| 2007/0146481 A1 | 6/2007 | Chen et al. |
| 2007/0171037 A1 | 7/2007 | Schofield et al. |
| 2008/0068520 A1 | 3/2008 | Minikey, Jr. et al. |

(56) References Cited

U.S. PATENT DOCUMENTS

| | | |
|---|---|---|
| 2008/0192132 A1 | 8/2008 | Bechtel et al. |
| 2008/0247192 A1 | 10/2008 | Hoshi et al. |
| 2008/0294315 A1 | 11/2008 | Breed |
| 2008/0302657 A1 | 12/2008 | Luten et al. |
| 2009/0015736 A1 | 1/2009 | Weller et al. |
| 2009/0141516 A1 | 6/2009 | Wu et al. |
| 2009/0296190 A1 | 12/2009 | Anderson et al. |
| 2010/0110553 A1 | 5/2010 | Anderson et al. |
| 2010/0201896 A1 | 8/2010 | Ostreko et al. |
| 2010/0277786 A1 | 11/2010 | Anderson et al. |
| 2011/0168687 A1 | 7/2011 | Door |
| 2011/0176323 A1 | 7/2011 | Skiver et al. |
| 2011/0181727 A1 | 7/2011 | Weller et al. |
| 2012/0038964 A1 | 2/2012 | De Wind et al. |
| 2012/0069444 A1 | 3/2012 | Campbell et al. |
| 2012/0229882 A1 | 9/2012 | Fish, Jr. et al. |
| 2012/0236388 A1* | 9/2012 | De Wind .......... B60R 1/04 359/267 |
| 2013/0028473 A1 | 1/2013 | Hilldore et al. |
| 2013/0279014 A1 | 10/2013 | Fish, Jr. et al. |
| 2014/0022390 A1 | 1/2014 | Blank et al. |
| 2014/0043479 A1 | 2/2014 | Busch et al. |
| 2014/0192431 A1 | 7/2014 | Sloterbeek et al. |
| 2014/0192520 A1 | 7/2014 | Baur et al. |
| 2014/0347488 A1 | 11/2014 | Tazaki et al. |

FOREIGN PATENT DOCUMENTS

| | | |
|---|---|---|
| EP | 0899157 A1 | 3/1999 |
| EP | 0899157 B1 | 10/2004 |
| EP | 1620763 B1 | 7/2012 |
| GB | 2338363 | 12/1999 |
| JP | 1178693 | 3/1999 |
| JP | 2002096685 A | 4/2002 |
| JP | 2002200936 A | 7/2002 |
| JP | 2005148119 | 6/2005 |
| JP | 2005327600 | 11/2005 |
| JP | 2008139819 A | 6/2008 |
| JP | 2009542505 A | 12/2009 |
| JP | 2013244753 A | 12/2013 |
| WO | 9621581 | 7/1996 |
| WO | 2007103573 A2 | 9/2007 |
| WO | 2010090964 | 8/2010 |

OTHER PUBLICATIONS

Palalau et al., "FPD Evaluation for Automotive Application," Proceedings of the Vehicle Display Symposium, Nov. 2, 1995, pp. 97-103, Society for Information Display, Detroit Chapter, Santa Ana, CA.

Adler, "A New Automotive AMLCD Module," Proceedings of the Vehicle Display Symposium, Nov. 2, 1995, pp. 67-71, Society for Information Display, Detroit Chapter, Santa Ana, CA.

Sayer, et al., "In-Vehicle Displays for Crash Avoidance and Navigation Systems," Proceedings of the Vehicle Display Symposium, Sep. 18, 1996, pp. 39-42, Society for Information Display, Detroit Chapter, Santa Ana, CA.

Knoll, et al., "Application of Graphic Displays in Automobiles," SID 87 Digest, 1987, pp. 41-44, 5A.2.

Terada, et al., "Development of Central Information Display of Automotive Application," SID 89 Digest, 1989, pp. 192-195, Society for Information Display, Detroit Center, Santa Ana, CA.

Thomsen, et al, "AMLCD Design Considerations for Avionics and Vetronics Applications," Proceedings of the 5th Annual Flat Panel Display Strategic and Technical Symposium, Sep. 9-10, 1998, pp. 139-145, Society for Information Display, Metropolitan Detroit Chapter, CA.

Knoll, et al., "Conception of an Integrated Driver Information System," SID International Symposium Digest of Technical Papers, 1990, pp. 126-129, Society for Information Display, Detroit Center, Santa Ana, CA.

Vincen, "An Analysis of Direct-View FPDs for Automotive Multi-Media Applications," Proceedings of the 6th Annual Strategic and Technical Symposium "Vehicular Applications of Displays and Microsensors," Sep. 22-23, 1999, pp. 39-46, Society for Information Display, Metropolitan Detroit Chapter, San Jose, CA.

Zuk, et al, "Flat Panel Display Applications in Agriculture Equipment," Proceedings of the 5th Annual Flat Panel Display Strategic and Technical Symposium, Sep. 9-10, 1998, pp. 125-130, Society for Information Display, Metropolitan Detroit Chapter, CA.

Vijan, et al., "A 1.7-Mpixel Full-Color Diode Driven AM-LCD," SID International Symposium, 1990, pp. 530-533, Society for Information Display, Playa del Rey, CA.

Vincen, "The Automotive Challenge to Active Matrix LCD Technology," Proceedings of the Vehicle Display Symposium, 1996, pp. 17-21, Society for Information Display, Detroit Center, Santa Ana, CA.

Corsi, et al, "Reconfigurable Displays Used as Primary Automotive Instrumentation," SAE Technical Paper Series, 1989, pp. 13-18, Society of Automotive Engineers, Inc., Warrendale, PA.

Schumacher, "Automotive Display Trends," SID 96 Digest, 1997, pp. 1-6, Delco Electronics Corp., Kokomo, IN.

Knoll, "The Use of Displays in Automotive Applications," Journal of the SID 5/3 1997, pp. 165-172, 315-316, Stuttgart, Germany.

Donofrio, "Looking Beyond the Dashboard," SID 2002, pp. 30-34, Ann Arbor, MI.

Stone, "Automotive Display Specification," Proceedings of the Vehicle Display Symposium, 1995, pp. 93-96, Society for Information Display, Detroit Center, Santa Ana, CA.

\* cited by examiner

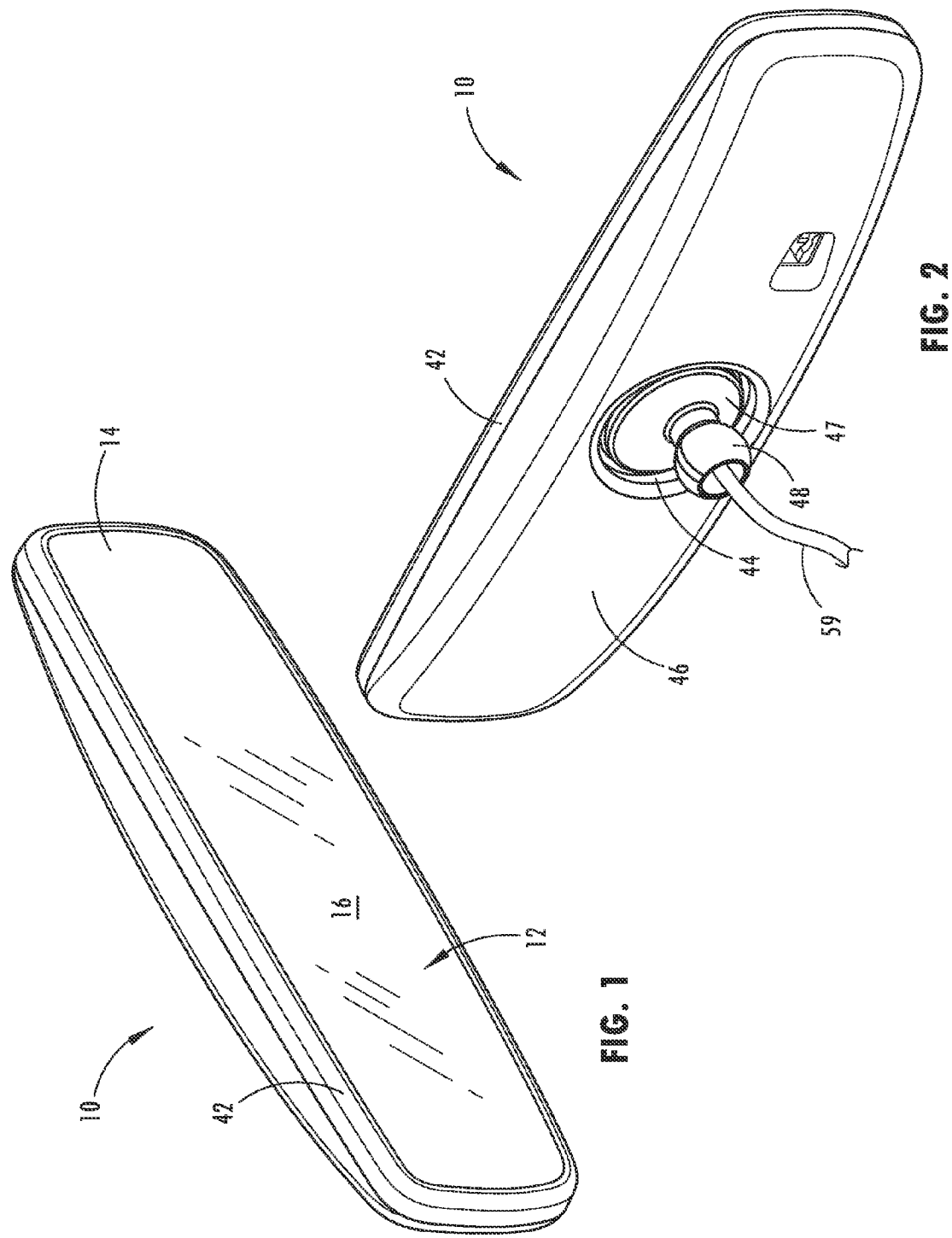

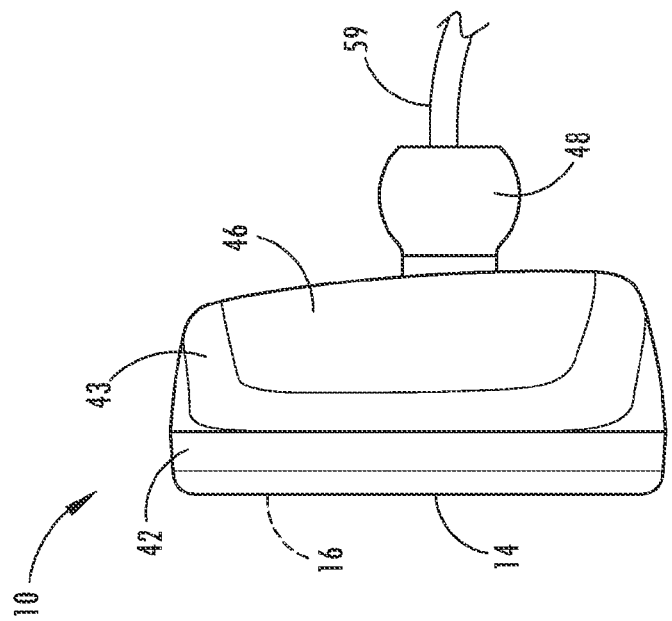
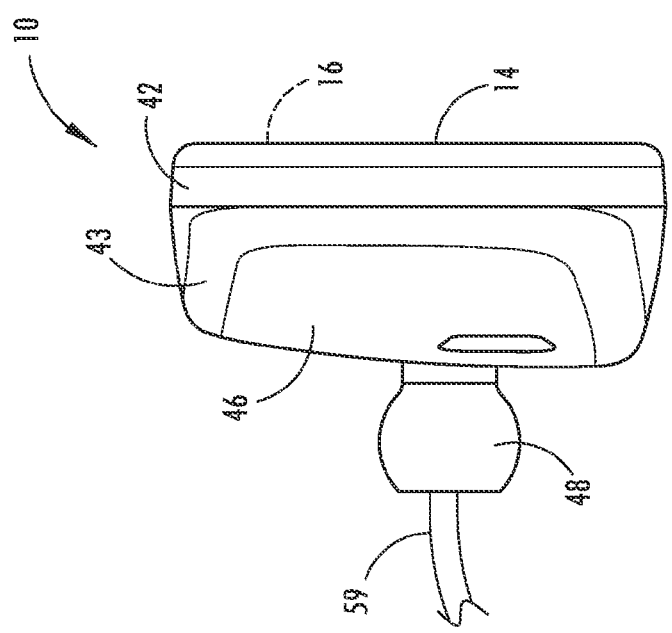

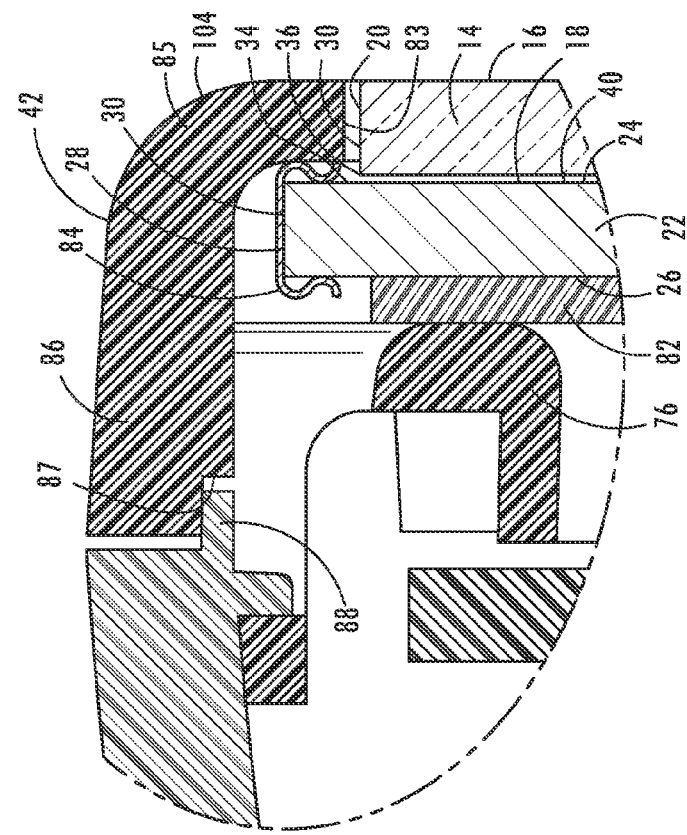
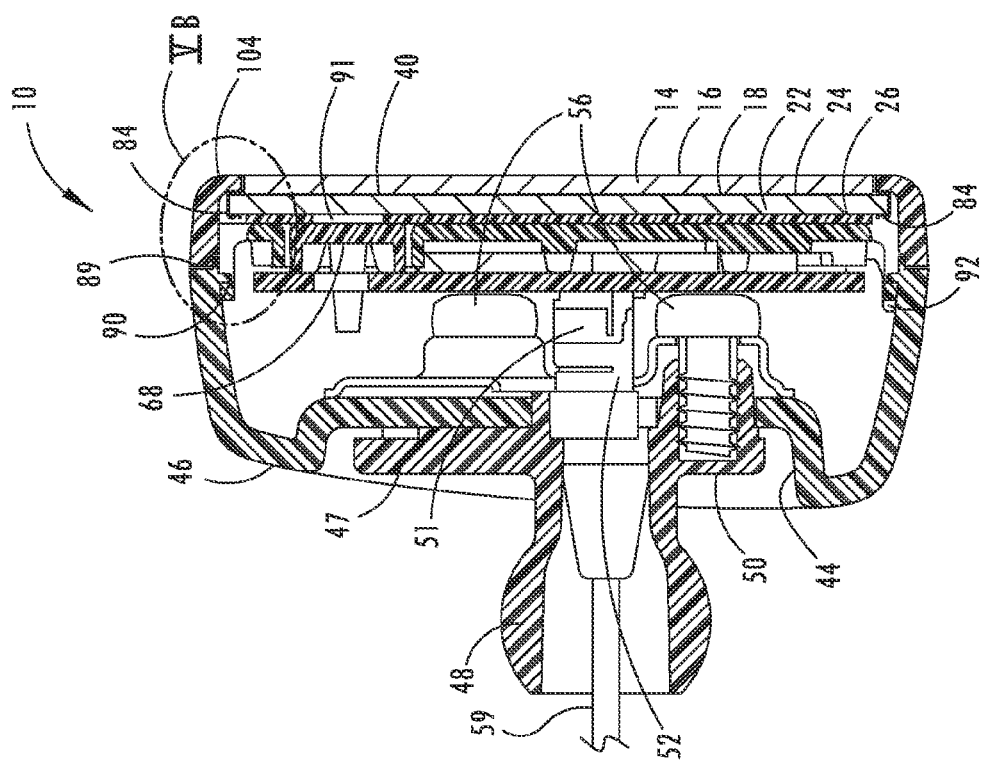
FIG. 5B
FIG. 5A

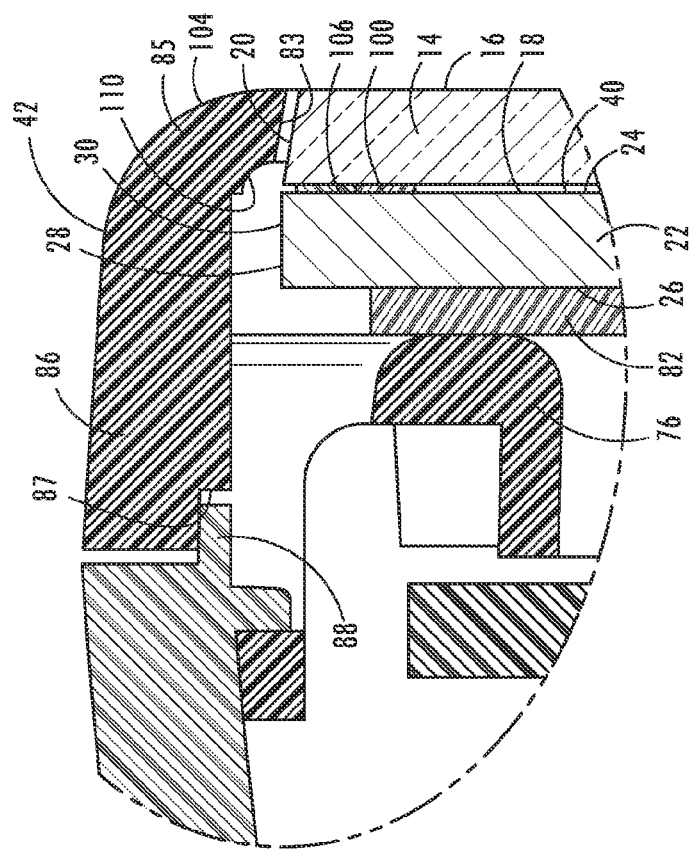
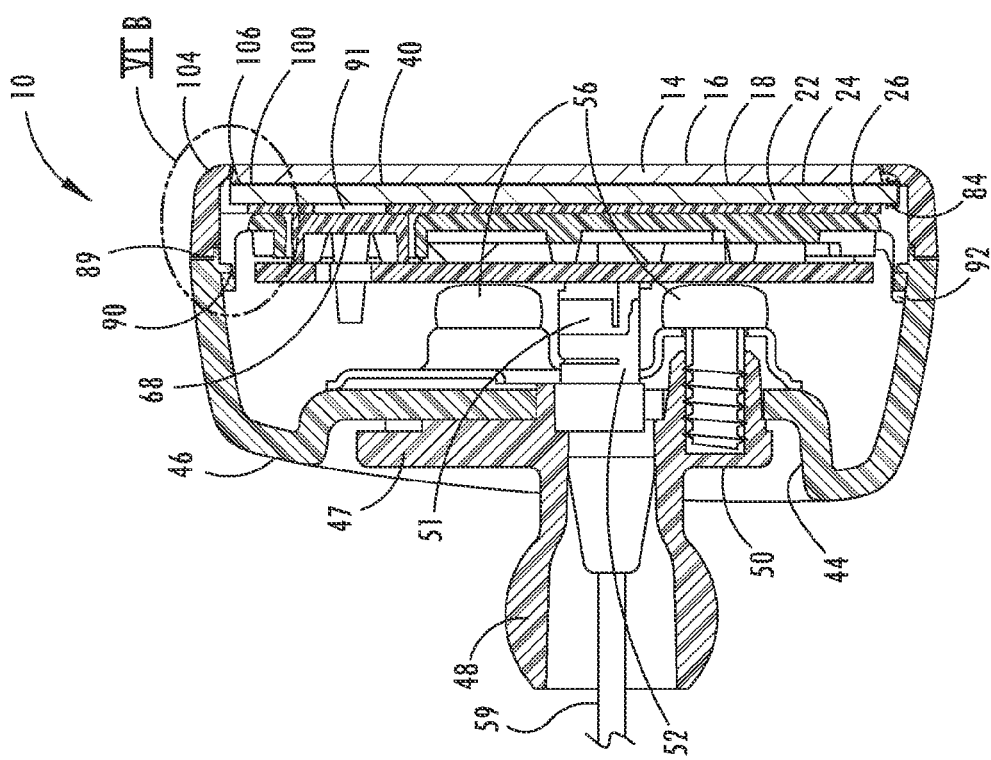
FIG. 6B
FIG. 6A

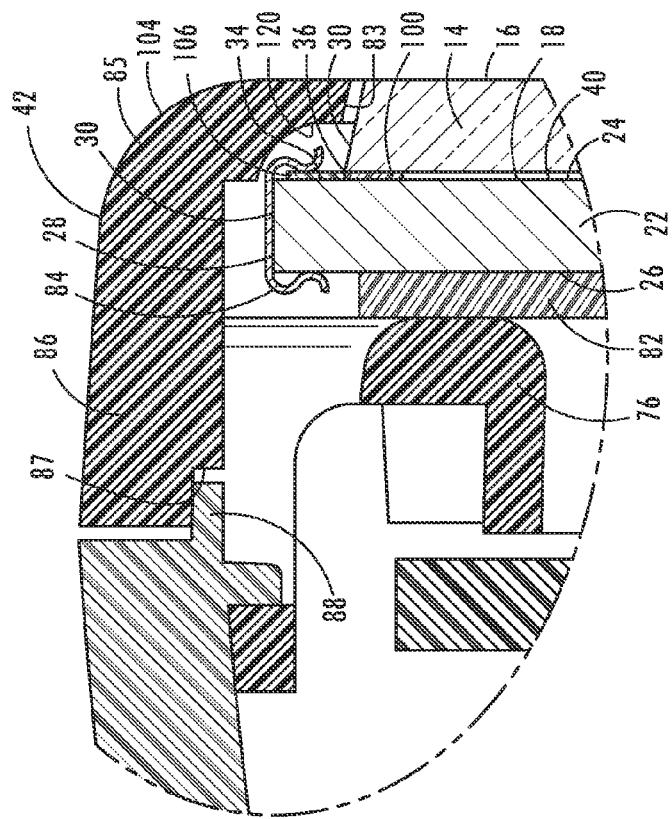
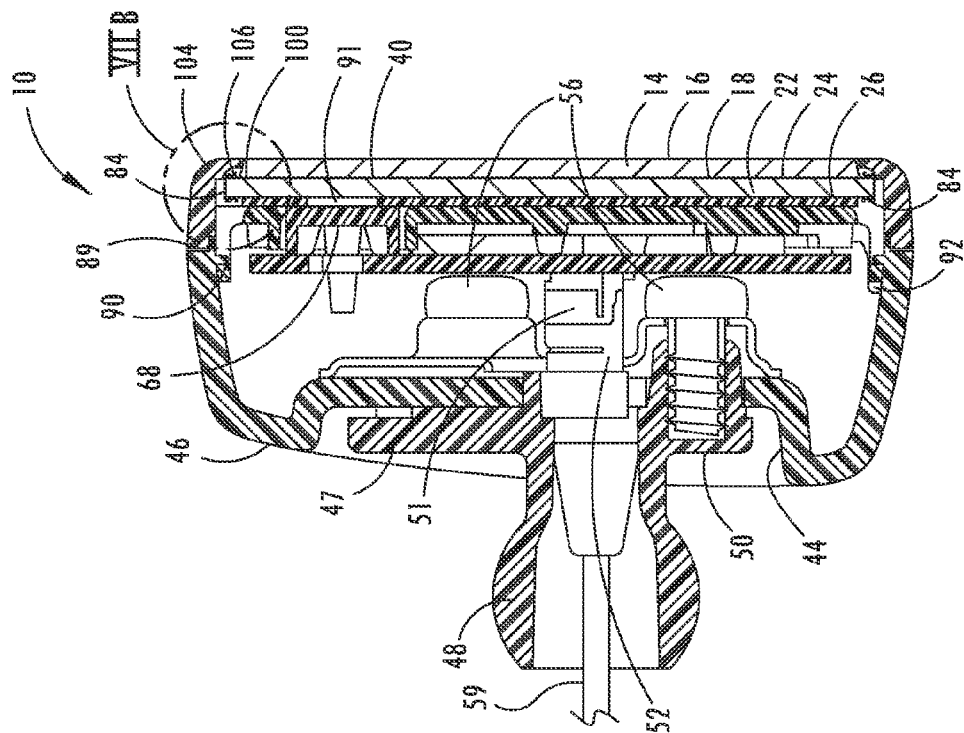
FIG. 7B
FIG. 7A

REARVIEW ASSEMBLY

CROSS-REFERENCE TO RELATED APPLICATION

This application claims priority to and the benefit under 37 U.S.C. §119(e) of U.S. Provisional Application No. 62/052,619, filed on Sep. 19, 2014, entitled "REARVIEW ASSEMBLY," the disclosure of which is hereby incorporated herein by reference in its entirety.

BACKGROUND OF THE DISCLOSURE

The present disclosure generally relates to a rearview assembly for a vehicle, and more specifically, to a rearview assembly with an electrochromic element.

SUMMARY OF THE PRESENT DISCLOSURE

One aspect of the present disclosure includes a rearview assembly having an electrochromic element. A front substrate defines a first surface and a second surface. A front side edge is disposed between the first surface and the second surface. A rear substrate is operably coupled with the front substrate and spaced a predetermined distance therefrom. The rear substrate defines a third surface and a fourth surface. A rear side edge is disposed between the third surface and the fourth surface. A perimeter of the rear substrate is larger than a perimeter of the front substrate, such that an outer portion of the third surface is exposed, thereby defining a peripheral step between the front side edge and the rear side edge. An electrochromic material is disposed between the front substrate and the rear substrate. A bezel is configured to extend around the rear substrate, over the outer portion of the third surface.

Another aspect of the present disclosure includes a rearview assembly having an electrochromic element. A front substrate defines a first surface and a second surface. A front side edge is disposed between the first surface and the second surface. A first area defined by the first surface is smaller than a second area defined by the second surface. The front side edge tapers outwardly from the first surface to the second surface. A rear substrate is operably coupled with the front substrate and spaced a predetermined distance therefrom. The rear substrate defines a third surface and a fourth surface. A rear side edge is disposed between the third surface and the fourth surface. An electrochromic material is disposed between the front substrate and the rear substrate. A bezel is configured to extend over the rear substrate, proximate the front substrate. The bezel includes an inner wall that is tapered to substantially compliment the taper of the front side edge and a substantially flat front wall that is generally coplanar with the first surface of the front substrate.

Yet another aspect of the present disclosure includes a rearview assembly having an electrochromic element. A front substrate defines a first surface and a second surface. A front side edge is disposed between the first surface and the second surface. A rear substrate is operably coupled with the front substrate and spaced a predetermined distance therefrom. The rear substrate defines a third surface and a fourth surface. A rear side edge is disposed between the third surface and the fourth surface. A perimeter of the rear substrate is larger than a perimeter of the front substrate, such that an outer portion of the third surface is exposed, thereby defining a peripheral step between the front side edge and the rear side edge. An electrochromic material is disposed between the front substrate and the rear substrate. A carrier plate is disposed proximate the fourth surface of the rear substrate and includes a peripheral engagement flange extending rearwardly from the carrier plate. A circuit board is supported by the carrier plate and includes a wire connection port configured for engagement with a power and data plug. A bezel is configured to extend around the rear substrate, over the outer portion of the third surface.

Yet another aspect of the present disclosure includes a rearview assembly having an electrochromic element. A front substrate defines a first surface and a second surface and a front side edge is disposed between the first surface and the second surface. A rear substrate is operably coupled with the front substrate and is spaced a predetermined distance therefrom. The rear substrate defines a third surface and a fourth surface and a rear side edge is disposed between the third surface and the fourth surface. An electrochromic material is disposed between the front substrate and the rear substrate. A housing is free of a wire harness assembly and includes a power/data plug in a rear portion thereof. A pivot ball is operably coupled to a rear portion of the housing and is configured to receive a vehicle wire harness that engages the power/data plug.

Still another aspect of the present disclosure includes a rearview assembly having an electrochromic element that includes a front substrate and a rear substrate. The rear substrate includes a larger outer perimeter than the front substrate and is configured for placement in front of or inside a rearview assembly housing. A bezel is provided that is configured to extend over peripheral edges of the front substrate and the rear substrate. The bezel includes a front wall that is substantially coplanar a first surface of the front substrate and a sidewall that is substantially flush with an outer wall of the housing. Accordingly, a smooth and apparently seamless transition is made from the first surface of the front substrate around the bezel and to the outside surface of the housing. This construction leads to a thin profile for the rearview assembly as a whole, thereby providing a more graspable rearview assembly for a user, a lighter rearview assembly, which is useful in minimizing fatigue on a ball joint of the rearview assembly.

These and other aspects, objects, and features of the present disclosure will be understood and appreciated by those skilled in the art upon studying the following specification, claims, and appended drawings. It will also be understood that features of each embodiment disclosed herein may be used in conjunction with, or as a replacement for, features of the other embodiments.

BRIEF DESCRIPTION OF THE DRAWINGS

In the drawings:

FIG. 1 is a front top perspective view of one embodiment of a rearview assembly of the present disclosure;

FIG. 2 is a rear top perspective view of the rearview assembly of FIG. 1;

FIG. 3 is a first side elevational view of the rearview assembly of FIG. 1;

FIG. 4 is a second side elevational view of the rearview assembly of FIG. 1;

FIG. 5A is a side cross-sectional view of one embodiment of the rearview assembly of FIG. 5 after assembly;

FIG. 5B is an enlarged side cross-sectional view of area VB of the rearview assembly of FIG. 5A;

FIG. 6A is a side cross-sectional view of the rearview assembly of FIG. 6 after assembly;

FIG. 6B is an enlarged side cross-sectional view of area VIB of the rearview assembly of FIG. 6A;

FIG. 7A is a side cross-sectional view of the rearview assembly of FIG. 7 after assembly; and FIG. 7B is an enlarged side cross-sectional view of area VIIB of the rearview assembly of FIG. 7A.

DETAILED DESCRIPTION OF EMBODIMENTS

Figure 5:
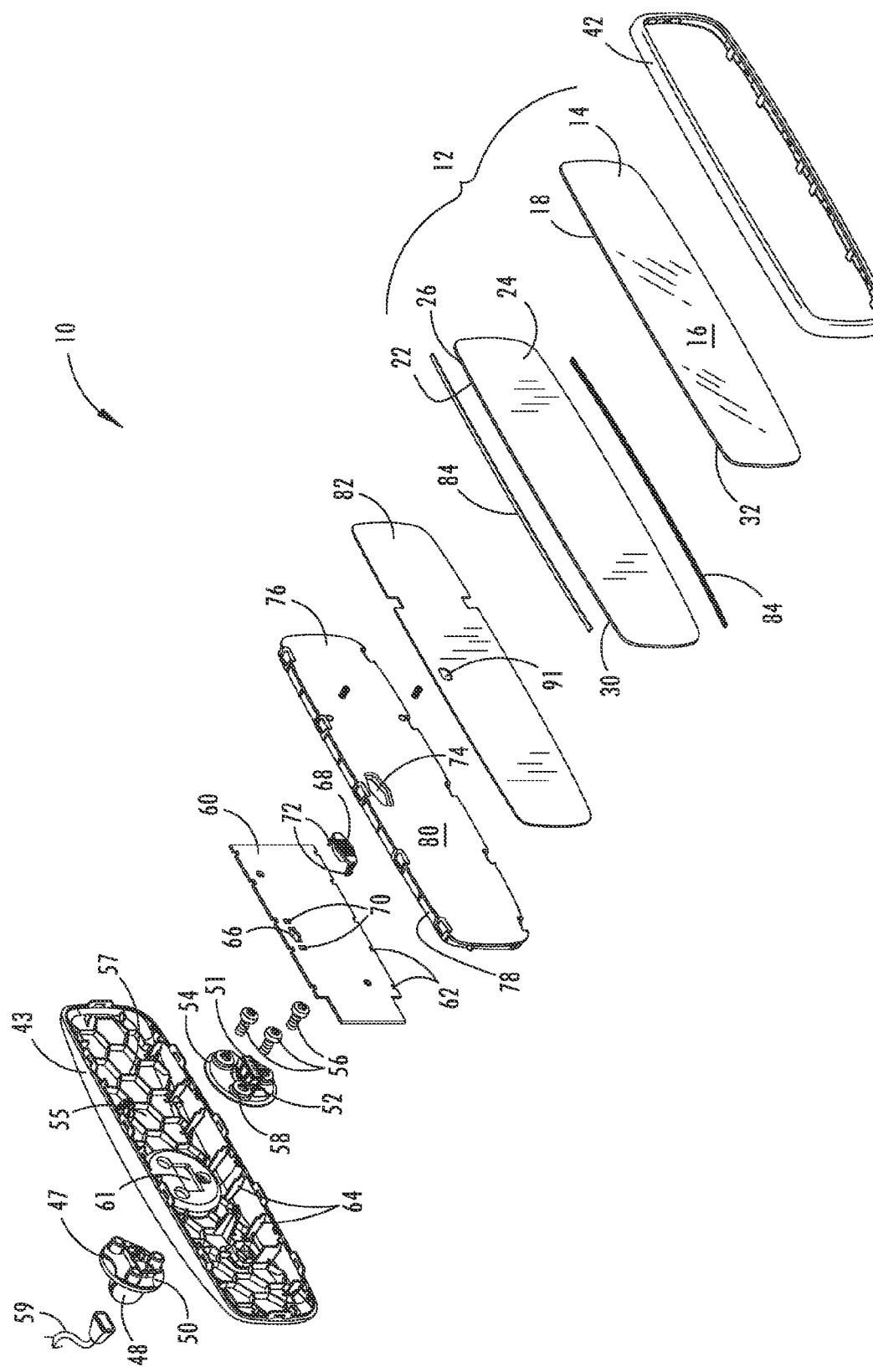
FIG. 5 is an exploded front perspective view of another embodiment of a rearview assembly of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring to FIGS. 1-5B, reference numeral 10 generally designates a rearview assembly having an electro-optic element, such as an electrochromic element 12. A front substrate 14 defines a first surface 16 and a second surface 18. A front side edge 20 is disposed between the first surface 16 and the second surface 18. A rear substrate 22 is operably coupled with the front substrate 14 and spaced a predetermined distance therefrom. The rear substrate 22 defines a third surface 24 and a fourth surface 26. A rear side edge 28 is disposed between the third surface 24 and the fourth surface 26. A perimeter 30 of the rear substrate 22 is larger than a perimeter 32 of the front substrate 14, such that an outer portion 34 of the third surface 24 is exposed, thereby defining a peripheral step 36 between the front side edge 20 and the rear side edge 28. An electro-optic material, such as an electrochromic material 40 is disposed between the front substrate 14 and the rear substrate 22. A bezel 42 is configured to extend around the rear substrate 22 over the outer portion 34 of the third surface 24.

Referring now to FIGS. 1-13, the illustrated rearview assembly 10 is generally configured for use in an interior of a vehicle. More specifically, the rearview assembly 10 is configured for attachment to a windshield or a headliner of a vehicle. The rearview assembly 10 has a housing 43 with a smooth outer appearance. Specifically, the rearview assembly 10 gives the impression of a smooth seamless transition from the first surface 16 of the front substrate 14 roughly 90 degrees to an outer sidewall of the housing 43. It will be understood that the housing 43 may take on a variety of constructions and is not limited to the configuration shown herein. Although a double ball configuration is illustrated, any of the constructions discussed herein can be used with single ball or double ball systems. The housing 43 includes a recess 44 in a rear wall 46 of the housing 43. The recess 44 is configured to receive a pivot ball assembly 47 that includes a pivot ball 48 on a rear side 50 and a power/data relay 51 having a power/data plug 52 on a front side 54 (see FIG. 9). An inside area 55 of the rear wall 46 of the housing 43 includes a honeycomb type reinforcing structure 57 configured to provide additional structural rigidity to the housing 43. It is contemplated that further reinforcing structures can also be utilized.

With reference to FIGS. 5-5B, a plurality of attachment features 56 secure a bracket 58 holding the power/data plug 52. By nesting the data plug 52 into the bracket 58, there is no vehicle wire harness extending inside the housing 43, which minimizes or eliminates the possibility of pinching/shorting out wires if the rearview assembly 10 is assembled incorrectly in production. In addition, because the housing 43 is free of wires in a rear portion of the housing 43, the housing 43 can be made smaller and sleeker, or can be configured to accommodate other components. The power/data plug 52 is configured to engage a vehicle wire harness 59 that extends through the pivot ball 48. The vehicle wire harness 59 is coupled with the vehicle and may be connected with a cam bus of the vehicle. As illustrated, the power/data plug 52 is configured for reception into a receiving aperture 61 defined through the rear wall 46 of the housing 43. The rear wall 46 of the housing 43 is disposed between the pivot ball assembly 47 and the bracket 58. A circuit board 60 is positioned in the housing 43 in front of the bracket 58 and includes a connection port operably coupled thereto for receiving the power/data plug 52. The circuit board 60 includes a plurality of notches 62 configured to engage alignment features 64 disposed in the housing 43. In addition, the circuit board 60 includes a glare sensor aperture 66 for receiving a glare sensor lens 68, as well as receiving slots 70 for receiving engagement arms 72 of the glare sensor lens 68. The glare sensor lens 68 is operably coupled with the circuit board 60 and configured to extend through a receiving cavity 74 in an oversized carrier plate 76. The carrier plate 76 includes a number of attachment features disposed about a periphery thereof, as well as a peripheral engagement flange 78 that extends rearwardly from the carrier plate 76. The peripheral engagement flange 78 extends generally orthogonally relative to the planar extent of the carrier plate 76. Further, the carrier plate 76 includes a front planar surface 80 that is configured for attachment with an adhesive material 82 that supports the fourth surface 26 of the rear substrate 22. The adhesive may be provided in a variety of manners, for example, the adhesive may be a foam material or a dispensable liquid. The rear substrate 22 is adjacent to the front substrate 14 and the electrochromic material 40 is disposed therebetween. The electrochromic element 12 may include a peripheral hiding layer 100 configured to conceal J-clips or bus bar 84 disposed on the periphery of the electrochromic element 12 and the carrier plate 76 are retained in the housing 43 by the bezel 42.

With reference again to FIGS. 5-5B, the bezel 42 is generally configured to extend around at least a portion of the electrochromic element 12. The bezel 42 includes a forward securing portion 85 that extends in front of the rear substrate 22 such that the outer portion 34 of the third surface 24 is covered by the bezel 42. An inner wall 83 of the bezel 42 is configured to substantially complement the front side edge 20 of the front substrate 14. This configuration conceals the J-clip or bus bar 84 from view such that the size of any concealing layer can be minimized. Alternatively, in some instances, it may be possible to completely eliminate the concealing layer altogether. The forward securing portion 85 is proximate or in abutting contact with the front side edge 20 of the front substrate 14. A body portion 86 of the bezel 42 includes a rear notched portion 87 configured to operably couple with a complementary notched portion 88 on a forward edge 89 of the housing 43. The electrochromic element 12 is generally disposed inside a portion of the housing 43 and is supported by the carrier plate 76. As previously noted, the carrier plate 76 is operably coupled to the fourth surface 26 of the rear substrate 22 by the adhesive material 82. An outer portion of the fourth surface 26 of the rear substrate 22 is generally free of the adhesive material 82. Similarly, an aperture 91 defined in the carrier plate 76 configured to receive the glare sensor lens 68 is also generally free of the adhesive material 82.

With reference once again to FIGS. 5-5B, in addition to engaging the alignment features 64 of the housing 43, the circuit board 60 is also configured to be received between top and bottom flange members 90, 92 of the peripheral engagement flange 78 of the carrier plate 76. The peripheral engagement flange 78 of the carrier plate 76 extends rearwardly from the carrier plate 76 about a periphery of the carrier plate 76 on a rear side thereof. As noted herein, the glare sensor lens 68 is operably coupled with the circuit board 60 and is configured for reception in the receiving cavity 74 defined in the carrier plate 76. One of a J-clip or bus bar 84 is configured to extend between the front substrate 14 and the rear substrate 22. In addition, at least the rear substrate 22 is configured to be at least partially covered by the bezel 42 during assembly.

Figure 6:
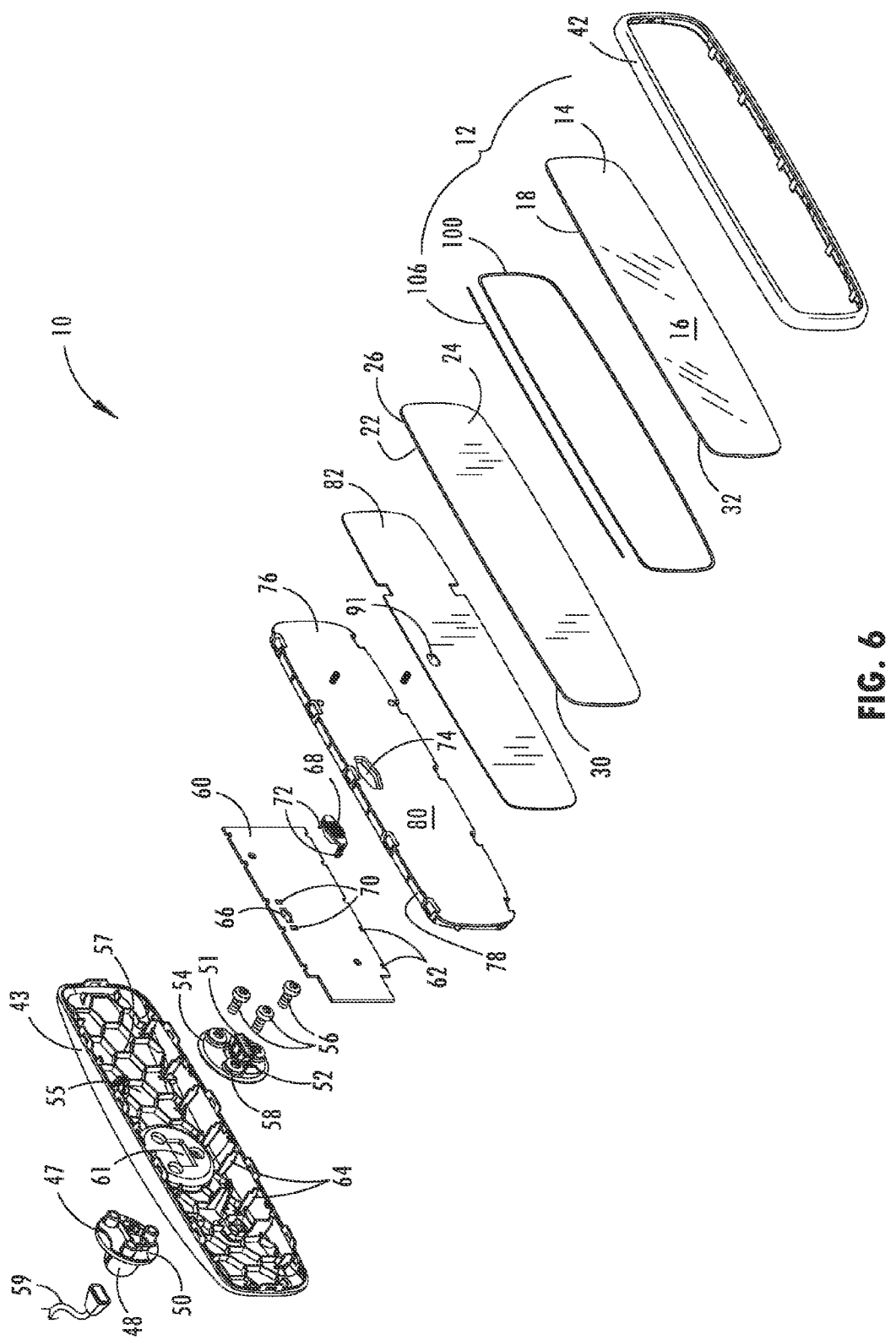
FIG. 6 is an exploded front perspective view of another embodiment of a rearview assembly of the present disclosure.

With reference now to FIGS. 6-6B, another embodiment of the present disclosure is illustrated. It will be understood that features of this embodiment that are similar to the previous embodiment will include the same reference numerals. In this embodiment, a bus bar 84 or J-clip is used in conjunction with the front substrate 14 and the rear substrate 22. The bus bar 84 or J-clip is hidden by the peripheral hiding layer 100 generally designed to conceal the bus bar 84 or J-clip from view through the first surface 16 of the front substrate 14. It is also contemplated that the peripheral hiding layer 100 may, in combination with the bezel 42, hide the bus bar 84 or J-clip. A seal 106 is disposed outside the peripheral hiding layer 100. It is contemplated that the seal 106 may be a black epoxy seal that extends around the entire perimeter. In the illustrated embodiment, the seal 106 is a silver epoxy, which could be replaced with a bus bar, if desired. As shown in FIG. 6A, the first surface 16 includes an area that is generally less than an area of the second surface 18 of the front substrate 14. However, the second surface 18 of the front substrate 14 includes an area that is generally similar to or the same as the area of the third surface 24 and the fourth surface 26 of the rear substrate 22. The front substrate 14 includes a tapered front side edge 20 that tapers outwardly from the first surface 16 of the second surface 18. Notably, the bezel 42 is designed to extend around an edge of the electrochromic element 12. More specifically, the inner wall 83 of the bezel 42 is tapered to substantially complement the taper of the front side edge 20 of the front substrate 14. It is contemplated that the forward securing portion 85 may be in abutting contact with the front side edge 20 or spaced a predetermined distance therefrom. In addition, the bezel 42 includes a substantially flat front wall 104 that is generally coplanar with the first surface 16 of the front substrate 14. This construction allows for an aesthetically pleasing construction that is easily graspable by a user and provides a nice fit and finish.

With reference again to FIGS. 6-6B, the tapered bezel 42 extends partially in front of the second surface 18 of the front substrate 14, as well as the third surface 24 and the fourth surface 26 of the rear substrate 22. The bezel 42 includes a small cutout 110 configured to accommodate a bus bar 84 or J-clip proximate the rear side edge 28 of the rear substrate 22. Consequently, the peripheral hiding layer 100 can be relatively small and cover less than 4.5 mm and possibly less than 2 mm of the third surface 24. Stated differently, the peripheral hiding layer 100 extends less than 3 mm from the front side edge 20 of the front substrate 14 into an intermediate area between the second surface 18 and the third surface 24.

Figure 7:
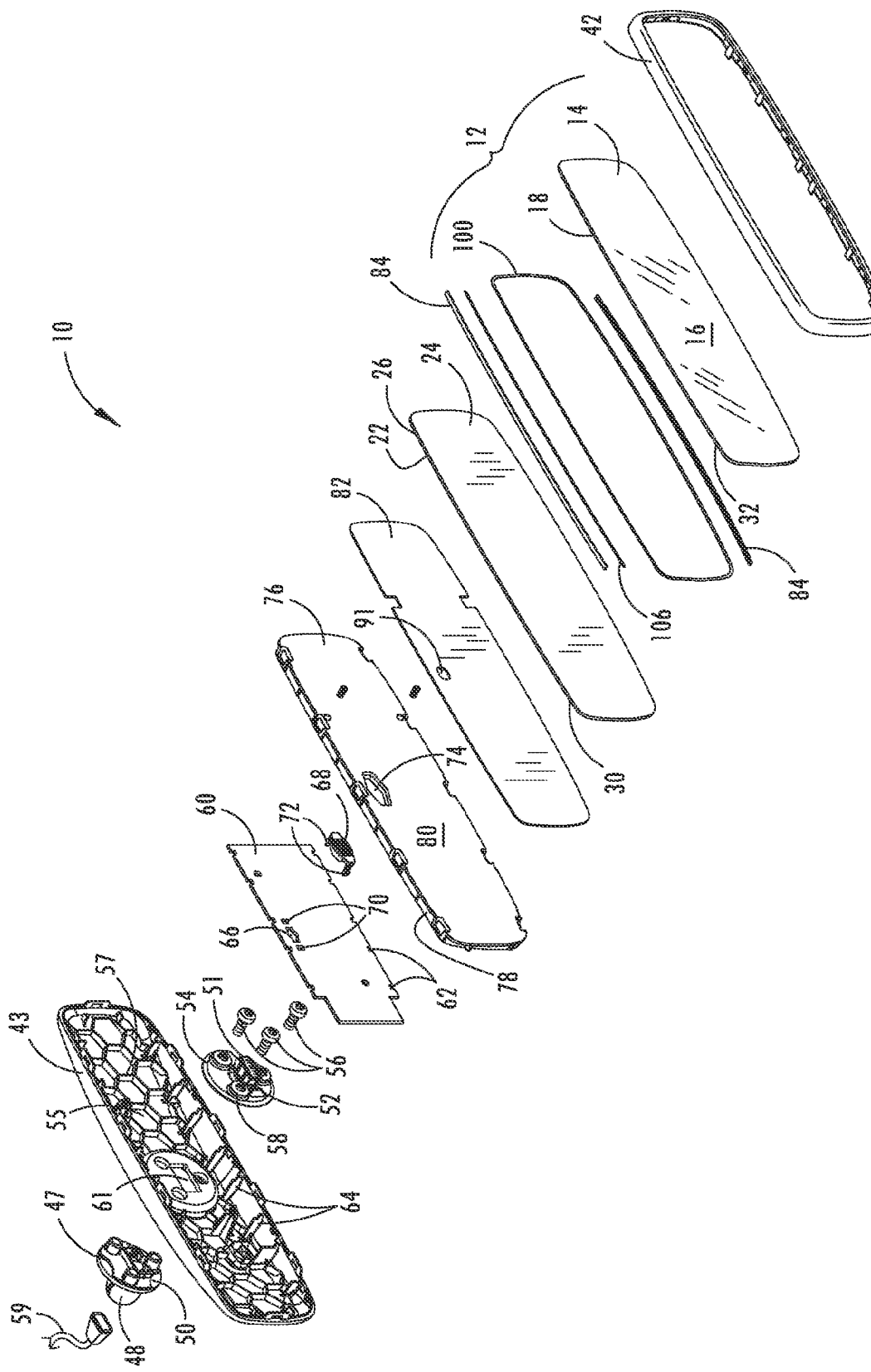
FIG. 7 is an exploded front perspective view of yet another embodiment of a rearview assembly of the present disclosure.

With reference now to FIGS. 7-7B, another embodiment of the present disclosure is illustrated. As with the previous embodiments, it will be understood that features of this embodiment that are similar to the previous embodiments will include the same reference numerals. In this embodiment, the front substrate 14 has a perimeter that is smaller than a perimeter of the rear substrate 22, similar to the embodiment illustrated in FIG. 5B. However, unlike the embodiment illustrated in FIG. 5B, the front side edge 20 of the front substrate 14 is angled. Further, because the perimeter of the rear substrate 22 is larger than the perimeter of the front substrate 14, the outer portion 34 of the third surface 24 of the rear substrate 22 is exposed, thereby defining a peripheral step between the front side edge 20 and the rear side edge 28. In addition, a first area defined by the first surface 16 is smaller than a second area defined by the second surface 18. Thus, the front side edge 20 tapers outwardly from the first surface 16 to the second surface 18. The tapered bezel 42 extends partially in front of the second surface 18 of the front substrate 14, as well as the third surface 24 and the fourth surface 26 of the rear substrate 22. Consequently, the peripheral hiding layer 100 can be relatively small and cover less than 4.5 mm and possibly less than 2 mm of the third surface 24. Stated differently, the peripheral hiding layer 100 extends less than 3 mm from the front side edge 20 of the front substrate 14 into an intermediate area between the second surface 18 and the third surface 24. The bezel 42, as shown in FIG. 7B, includes an enlarged cutout 120 configured to accommodate the bus bar 84 or a J-clip.

The present disclosure may be used with a rearview assembly such as that described in U.S. Pat. Nos. 8,925,891; 8,814,373; 8,201,800; and 8,210,695; U.S. Patent Application Publication Nos. 2014/0063630 and 2012/0327234; and U.S. Provisional Patent Application Nos. 61/709,716; 61/707,676; and 61/704,869, which are hereby incorporated herein by reference in their entirety. Further, the present disclosure may be used with a rearview packaging assembly such as that described in U.S. Pat. Nos. 8,885,240; 8,814,373; 8,646,924; 8,643,931; and 8,264,761; and U.S. Provisional Patent Application Nos. 61/707,625; and 61/590,259, which are hereby incorporated herein by reference in their entirety. Additionally, it is contemplated that the present disclosure can include a bezel such as that described in U.S. Pat. Nos. 8,827,517; 8,210,695; and 8,201,800, which are hereby incorporated herein by reference in their entirety.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A rearview assembly comprising:
   an electro-optic element including:
      a front substrate defining a first surface and a second surface and a front side edge disposed between the first surface and the second surface, wherein a first area defined by the first surface is smaller than a second area defined by the second surface, and wherein the front side edge tapers outwardly from the first surface to the second surface;
      a rear substrate operably coupled with the front substrate and spaced a predetermined distance therefrom, the rear substrate defining a third surface and a fourth surface and a rear side edge disposed between the third surface and the fourth surface, wherein a perimeter of the rear substrate is larger than a perimeter of the front substrate, such that an outer portion of the third surface is exposed, thereby defining a peripheral step between the front side edge and the rear side edge; and
      an electro-optic material disposed between the front substrate and the rear substrate; and
   a bezel configured to extend around the rear substrate, over the outer portion of the third surface.

2. The rearview assembly of claim 1, wherein the bezel includes a substantially flat front wall that is generally coplanar with the first surface of the front substrate.

3. The rearview assembly of claim 1, further comprising:
   a housing; and
   a wire harness extending through a pivot ball that extends from a rear wall of the housing.

4. The rearview assembly of claim 3, further comprising:
   a circuit board proximate the electro-optic element having a connection port operably coupled thereto.

5. The rearview assembly of claim 4, further comprising:
   a power and data plug operably coupling the connection port with a vehicle wire harness that extends through a housing of said rearview assembly.

6. The rearview assembly of claim 1, further comprising:
   a peripheral hiding layer disposed between the second surface and the third surface.

7. The rearview assembly of claim 6, wherein the peripheral hiding layer extends less than 3 mm from the front side edge of the front substrate into an intermediate area between the second surface and the third surface.

8. The rearview assembly of claim 7, wherein the peripheral hiding layer and the bezel generally conceal one of a J-clip and a bus bar from view through the first surface of the front substrate.

9. A rearview assembly comprising:
   an electro-optic element including:
      a front substrate defining a first surface and a second surface and a front side edge disposed between the first surface and the second surface, wherein a first area defined by the first surface is smaller than a second area defined by the second surface and wherein the front side edge tapers outwardly from the first surface to the second surface;
      a rear substrate operably coupled with the front substrate and spaced a predetermined distance therefrom, the rear substrate defining a third surface and a fourth surface and a rear side edge disposed between the third surface and the fourth surface; and an electro-optic material disposed between the front substrate and the rear substrate; and a bezel configured to extend over the rear substrate, proximate the front substrate, the bezel including an inner wall that is tapered to substantially compliment the taper of the front side edge, and further including a substantially flat front wall that is generally coplanar with the first surface of the front substrate.

10. The rearview assembly of claim 9, further comprising:
a circuit board proximate the electro-optic element having a connection port operably coupled thereto.

11. The rearview assembly of claim 9, further comprising:
a housing; and
a wire harness extending through a pivot ball that extends from a rear wall of the housing.

12. The rearview assembly of claim 9, wherein a perimeter of the rear substrate is larger than a perimeter of the front substrate, such that an outer portion of the third surface is exposed, thereby defining a peripheral step between the front side edge and the rear side edge.

13. The rearview assembly of claim 9, further comprising:
a housing; and
a carrier plate disposed proximate the fourth surface of the rear substrate and including a peripheral engagement flange extending rearwardly from the carrier plate that is configured for engagement with an inner wall of the housing.

14. The rearview assembly of claim 9, further comprising:
a peripheral hiding layer disposed between the second surface and the third surface.

15. A rearview assembly comprising:
an electro-optic element including:
a front substrate defining a first surface and a second surface and a front side edge disposed between the first surface and the second surface, wherein the first area defined by the first surface is smaller than the second area defined by the second surface, and wherein the front side edge tapers outwardly from the first surface to the second surface;
a rear substrate operably coupled with the front substrate and spaced a predetermined distance therefrom, the rear substrate defining a third surface and a fourth surface and a rear side edge disposed between the third surface and the fourth surface, wherein a perimeter of the rear substrate is larger than a perimeter of the front substrate, such that an outer portion of the third surface is exposed, thereby defining a peripheral step between the front side edge and the rear side edge; and an electro-optic material disposed between the front substrate and the rear substrate;

a carrier plate disposed proximate the fourth surface of the rear substrate and including a peripheral engagement flange extending rearwardly from the carrier plate;

a circuit board supported by the carrier plate and including a connection port configured for engagement with a power and data plug; and a bezel configured to extend around the rear substrate, over the outer portion of the third surface, wherein the bezel further includes an inner wall that is tapered to substantially compliment the taper of the front side edge.

16. The rearview assembly of claim 15, wherein the bezel includes a substantially flat front wall that is generally coplanar with the first surface of the front substrate.

17. The rearview assembly of claim 15, wherein the wire connection port is fixedly attached to a rear wall of the circuit board, and wherein the power and data plug is configured for reception in a receiving aperture defined through a rear wall of a housing of the rearview assembly.

18. A rearview assembly comprising:
an electro-optic element including:
a front substrate defining a first surface and a second surface and a front side edge disposed between the first surface and the second surface;
a rear substrate operably coupled with the front substrate and spaced a predetermined distance therefrom, the rear substrate defining a third surface and a fourth surface and a rear side edge disposed between the third surface and the fourth surface; and
an electro-optic material disposed between the front substrate and the rear substrate;

a housing that is free of a wire harness assembly and which includes a power/data plug in a rear portion thereof;

a bezel extending around the rear substrate and configured to define a space between the bezel and the rear substrate to retain one of a J-clip and a bus bar; and a pivot ball operably coupled to a rear portion of the housing and configured to receive a vehicle wire harness that engages the power/data plug.

* * * * *